United States Patent [19]

Kahara et al.

[11] Patent Number: 4,623,415
[45] Date of Patent: Nov. 18, 1986

[54] METHOD OF MAKING FUEL CELL

[75] Inventors: Toshiki Kahara; Shinpei Matsuda; Kenzo Ishii, all of Toukai; Seizi Takeuchi, Hitachiohta; Jinichi Imahashi; Akio Honji, both of Hitachi, all of Japan

[73] Assignees: Hitachi, Ltd.; Hitachi Chemical Co., Ltd., both of Tokyo, Japan

[21] Appl. No.: 692,562

[22] Filed: Jan. 18, 1985

Related U.S. Application Data

[62] Division of Ser. No. 414,394, Sep. 2, 1982, Pat. No. 4,529,671.

[30] Foreign Application Priority Data

Sep. 7, 1981 [JP] Japan ................................ 56-141525
Sep. 7, 1981 [JP] Japan ................................ 56-141524

[51] Int. Cl.$^4$ .............................................. C09J 1/00
[52] U.S. Cl. .................................... 156/325; 156/283; 264/128; 429/41; 429/44; 429/46
[58] Field of Search .................. 156/325, 283; 429/41, 429/44, 46; 264/128

[56] References Cited

U.S. PATENT DOCUMENTS

| | | | |
|---|---|---|---|
| 3,453,149 | 7/1969 | Adlhart et al. | 429/46 |
| 3,575,718 | 4/1971 | Adlhart et al. | 429/46 |
| 3,594,253 | 7/1971 | Froberg et al. | 156/325 |
| 4,017,664 | 4/1977 | Breault | 429/44 |

FOREIGN PATENT DOCUMENTS

| | | | |
|---|---|---|---|
| 56-18366 | 2/1981 | Japan | 429/41 |
| 332660 | 7/1930 | United Kingdom | 429/46 |

Primary Examiner—John J. Gallagher
Attorney, Agent, or Firm—Antonelli, Terry & Wands

[57] ABSTRACT

In a fuel cell comprising an electrolyte-retaining matrix interposed between a pair of gas-diffusion electrodes, the matrix comprises particles or fibers of a substance unreactive with phosphoric acid and having electron-insulating properties and an inorganic binder.

17 Claims, 6 Drawing Figures

METHOD OF MAKING FUEL CELL

This is a division of application Ser. No. 414,394, filed Sept. 2, 1982, now U.S. Pat. No. 4,529,671.

BACKGROUND OF THE INVENTION

1. Field of the Invention

The present invention relates to a phosphoric acid-type fuel cell comprising a pair of gas-diffusion electrodes and a porous matrix retaining phosphoric acid as an electrolyte (hereinafter referred to as phosphoric acid electrolyte-retaining matrix).

Particularly, the present invention relates to an electrolyte-retaining matrix and a process for producing the matrix.

2. Description of the Prior Art

As phosphoric acid electrolyte-retaining matrix, there has been used a phenolic resin fiber cloth or non-woven fabric or a mixture of silicon carbide powder and polytetrafluoroethylene (an organic binder).

These matrices are described in detail in the specification of U.S. Pat. No. 4,017,664. According to the disclosure of the specification of U.S. Pat. No. 4,017,664, phosphoric acid reacts with phenolic resin at a temperature of above 250° F. (about 121° C.) in the phenolic resin-type matrix. By this reaction, molecules which are adsorbed on the electrode catalyst to causing deterioration of the activity of the catalyst are formed, whereby the performance of the fuel cell is deteriorated. For preventing the reaction of phosphoric acid with the phenolic resin, it is effective to lower the operating temperature of the cell. However, another problem of serious reduction of output of the cell is posed by the lowering of the working temperature. When a mixture of silicon carbide powder with polytetrafluoroethylene (organic binder) is used as a matrix material, the operating temperature of the fuel cell can be elevated to about 190°–200° C. However, organic binders are generally water-repellent and particularly fluorine resins such as polytetrafluoroethylene has a high water-repellency and no affinity with phosphoric acid. Therefore, the electrolyte-retaining matrix has only a poor phosphoric acid-retaining capacity and the phosphoric acid-retaining capacity thereof is reduced gradually.

SUMMARY OF THE INVENTION

An object of the present invention is to provide a phosphoric acid-type fuel cell having a novel electrolyte-retaining matrix having a phosphoric acid-retaining power higher than that of an electrolyte-retaining matrix comprising a mixture of silicon carbide powder and polytetrafluoroethylene.

Another object of the present invention is to provide a process for producing the above-mentioned, novel electrolyte-retaining matrix.

Still another object of the present invention is to provide a process for producing an electrolyte-retaining matrix which can be stored easily before the incorporation in a fuel cell.

The fuel cell of the present invention comprises a pair of gas-diffusion electrodes and a porous matrix for retaining phosphoric acid electrolyte and is characterized in that the matrix consists essentially of a substance unreactive with phosphoric acid and having electron insulating properties and an inorganic binder.

According to the present invention, the above-mentioned matrix can be produced by following process (1) or (2):

(1) a process wherein a mixture of a powdery or fibrous substance which is unreactive with phosphoric acid and which has electron-insulating properties and a phosphate-forming inorganic material is prepared, then phosphoric acid is added to the mixture in an amount larger than that required for forming a phosphate and the whole is heated to form the phosphate, or (2) a process wherein a mixture of a powdery or fibrous substance which is unreactive with phosphoric acid and which has electron-insulating properties and a phosphate-forming inorganic material is prepared, then phosphoric acid is added to the mixture in an amount required for forming a phosphate and the whole is heated to form the phosphate.

DESCRIPTION OF THE PREFERRED EMBODIMENTS

Figure 1:
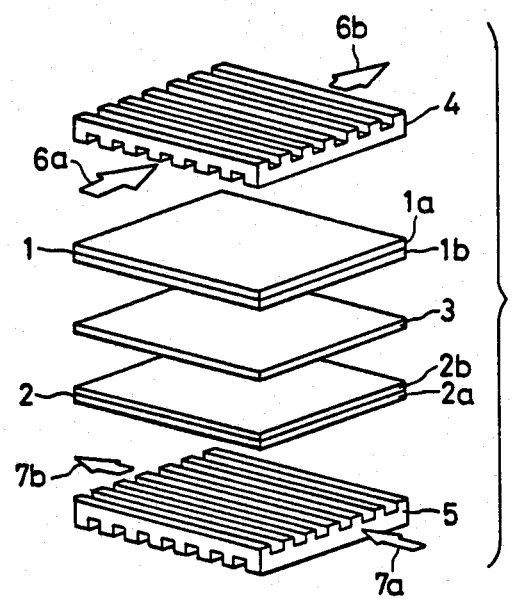
FIG. 1 is a perspective view showing the structure of a single cell of phosphoric acid-type fuel cell.

The substance unreactive with phosphoric acid and having electrone-insulating properties will be referred to as "phosphoric acid-resistant insulating substance".

The amount of the phosphoric acid-resistant insulating material in the phosphoric acid-type fuel cell of the present invention is 30–90 wt. %, particularly 50–70 wt. %, based on the electrolyte-retaining matrix. The balance is substantially an inorganic binder. If the amount of the phosphoric acid-resistant insulating substance is less than 30 wt. %, the volume of the pores retaining phosphoric acid is reduced and the phosphoric acid-retaining capacity becomes insufficient. If the amount thereof is more than 90 wt. %, the binding power of the phosphoric acid-resistant insulating substance becomes unsatisfactory. The phosphoric acid-resistant insulating substance is preferably in granular or fibrous form. The average particle diameter is preferably 0.1–10 μm and the length of the fiber is desirably 0.01–0.2 mm.

The amount of the inorganic binder is in the range of 10 wt. % to 70 wt. %. The preferred amount is 30–50 wt. %. If the amount of the inorganic binder is less than 10 wt. %, the power of binding the phosphoric acid-resistant insulating substance is poor and, on the other hand, if said amount is more than 50 wt. %, the pores are covered by the inorganic binder to reduce the effective volume thereof.

By binding the phosphoric acid-resistant insulating substance by means of the inorganic binder, the following superior effects are obtained as compared with effects obtained by using polytetrafluoroethylene (an organic binder):

(i) A high phosphoric acid-retaining capacity can be obtained, since the inorganic binder has a high affinity with phosphoric acid.

(ii) The inorganic binder is stable against heat and, therefore, it is not denatured even if it is used ior along period of time in phosphoric acid at a high temperature.

Preferred inorganic binders are metal phosphates. The metal phosphates have a quite high affinity with phosphoric acid and exhibit a strong binding power for the phosphoric acid-resistant insulating substance similar to polytetrafluoroethylene. As the metal phosphate, there is used preferably at least one compound selected from the group consisting of zirconium, tin, titanium, silicon and aluminum phosphates. Among them, zirconium phosphate is particularly preferred. These metal phosphates have a characteristic feature that they are stable in phosphoric acid at a high temperature and they are not denatured while they are used for a long period of time. Among them, zirconium phosphate can be prepared easily and have a high stability at a high temperature.

The phosphoric acid-resistant insulating substance has as strong as possible properties which are described in lines 23–36, column 1 of the specification of U.S. Pat. No. 4,017,664 in addition to the unreactivity with phosphoric acid and the electron-insulating properties. For realizing the electron-insulating properties, this substance has desirably an electric resistance of at least $10^7$ $\Omega$cm. Inorganic compounds such as oxides, carbides and nitrides have these properties. As preferred inorganic substances, there may be mentioned oxides such as compound oxides mainly comprising zirconium, e.g. zircon and tantalum pentoxide, carbides such as silicon carbide and tantalum carbide and nitrides such as boron nitride. Among them, silicon carbide is most preferred, since it is most inexpensive and available in abundance. A substance which forms the phosphate upon the reaction with phosphoric acid is mixed with the phosphoric acid-resistant insulating substance and then phosphoric acid is added thereto to effect the phosphate-forming reaction. A higher binding power for the phosphoric acid-resistant insulating substance is obtained by the latter process than that obtained by the a process wherein a metal phosphate is used from the initial stage.

The substance which forms a phosphate upon the reaction with phosphoric acid will be referred to as "phosphate-forming substance". This substance is at least one member selected from the group consisting of phosphate-forming metals, metal oxides and metal salt solutions.

When the metal oxide is used, the metal oxide $MO_x$ reacts with phosphoric acid $X.H_3PO_4$ to form a phosphate $M(HPO_4)_x$ which acts as a binder for the phosphoric acid-resistant insulating substance such as silicon carbide according to the following formula (1):

$$MO_x + X.H_3PO_4 \rightarrow M(HPO_4)_x + X.H_2O \quad (1)$$

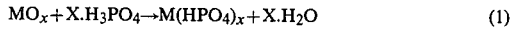

wherein M represents a metal and X represents a number of oxygen atoms bonded with the metal.

When the metal salt such as metal chloride is used, the metal chloride $MCl_x$ reacts with phosphoric acid $X/2.H_3PO_4$ to form $M(HPO_4)_{x/2}$ which acts as the binder for silicon carbide, etc. according to the following formula (2):

$$MCl_x + X/2.H_3PO_4 \rightarrow M(HPO_4)_{x/2} + X.HCl \quad (2)$$

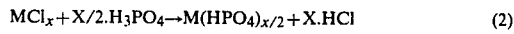

When the metal such as a tetravalent metal is used, a phosphate is formed according to the following formula (3) and the phosphate acts as the binder for silicon carbide, etc.:

$$M + 2H_3PO_4 \rightarrow M(HPO_4)_2 + 2H_2 \quad (3)$$

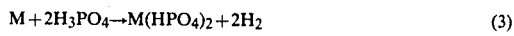

If the phosphate which acts as the binder is mixed with a substance having a high resistance to phosphoric acid such as silicon carbide, it binds silicon carbide to form a firm matrix comprising silicon carbide nucleus bound by means of the phosphate.

As the metal oxide used in the reaction of above formula (1), there may be mentioned any metal oxide reactive with phosphoric acid. As the metal oxides, zirconium oxide, titanium oxide, tin oxide, silicon oxide and aluminum oxide are suitable. These oxides may be used either alone or in the form of a proper mixture of them. As the metal salt used in the reaction of formula (2), there may be mentioned halides, hydroxides, oxychlorides and nitrates of one or more elements selected from the group consisting of zirconium, titanium, tin, silicon and aluminum.

As the metal used in the reaction of above formula (3), there may be used zirconium, titanium, tin or silicon or an adequate mixture of two or more of them. In case the oxide is used as the phosphoric acid-resistant insulating material, a part thereof may be used as the phosphate-forming substance. A care should be taken in this case, since if the amount of phosphoric acid is excessive, the amount of the phosphoric acid-resistant insulating substance becomes insufficient.

For the production of the electrolyte-retaining matrix from the phosphate-forming substance, two processes which will be stated below are preferred. These two processes have advantages peculiar to them.

In both processes, the powdery phosphoric acid-resistant insulating substance is mixed with the powdery phosphate-forming substance and then phosphoric acid is added to the mixture. Then, the mixture is heated to react the phosphate-forming substance with phosphoric acid, whereby a metal phosphate is formed which acts as the binder for the phosphoric acid-resistant insulating substance.

In the first of the two processes, phosphoric acid is used in an amount larger than that required for forming the phosphate. The excessive amount of phosphoric acid is used as the electrolyte. If the amount of phosphoric acid added is adequate, it is unnecessary to add phosphoric acid in the step of fabricating the fuel cell. Thus, the preferred amount of phosphoric acid is the sum of the amount required for forming the phosphate and the amount thereof used as the electrolyte.

In the second process, phosphoric acid is used in an amount required for forming the phosphate. If liquid phosphoric acid is present after the formation of the phosphate by the reaction of the phosphate-forming substance with phosphoric acid, phosphoric acid absorbs the water while they are stored as they are. For this reason, the water must be removed before this system is used for the fabrication of the fuel cell. If phosphoric acid does not remain after the formation of the phosphate by the reaction of the phosphate-forming substance with phosphoric acid, the water absorption is not caused during the storage. Even in case phosphoric acid is added in an amount larger than that required for forming the phosphate, the water absorption may be disregarded if the product is used for the fabrication of the fuel cell immediately thereafter without the storage. The mixture must be heated for forming the phosphate after the addition of phosphoric acid. The heating temperature is 100°–250° C.

If the average particle diameter of the phosphoric acid-resistant insulating substance is smaller than 0.1 μm, the pore volume is insufficient and, on the other hand, if it is larger than 10 μm, the capillary cohesion power is inclined to be reduced. If the fiber size is smaller than 0.01 mm, the pore volume is insufficient and, on the other hand, if it is larger than 0.2 mm, it becomes difficult to form the pores.

The average particle diameter of the powdery phosphate-forming substance is preferably 0.05–5 μm, since the particles of the phosphate formed are interspersed if the average particle diameter is larger and the binding power is reduced if the average particle diameter is smaller.

In the above-described process (i) for producing the electrolyte-retaining matrix, the amount of phosphoric acid used in the form of free phsphoric acid is suitably 40–80 wt. % based on the phosphoric acid-resistant insulating substance. In the above-described processes (i) and (ii), the mixture is heated to a temperature in the range of 100°–250° C. after the addition of phosphoric acid to complete the reaction and also to remove water from the resulting electrolyte-retaining matrix. If the amount of free phosphoric acid is smaller than 40 wt. %, the pores cannot be saturated with phosphoric acid sufficiently or the viscosity of the matrix containing free phosphoric acid becomes too high to use. If said amount is larger than 80 wt. %, the strength of the matrix is insufficient for the fabrication thereof on the electrode plate.

If the heating temperature after the addition of phosphoric acid is lower than 100° C., the reaction cannot be completed or it becomes difficult to remove water by-produced by the reaction. If the temperature is higher than 250° C., phosphoric acid is dehydration-condensed and properties thereof are altered. The heating after the addition of phosphoric acid is effected in two stages. It is preferred that the temperature in the latter stage is higher than that in the former stage so as to prevent the heterogenization of the matrix due to the rapid reaction.

An embodiment of the structure of a unit cell of the phosphoric acid type-fuel cell of the invention is shown in FIG. 1.

Hydrogen (fuel) is fed in a hydrogen electrode 1 and oxygen (oxidizer) is fed in an air electrode 2. They are reacted electrochemically to generate. an electric energy. At the hydrogen electrode 1, hydrogen is oxidized to release hydrogen ion and electron according to the following formula:

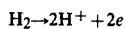

Hydrogen ion and the electron are sent to the air electrode 2 through phosphoric acid (electrolyte) and an external circuit, respectively. At the air electrode 2 oxygen hydrogen ion and the electron react together to form water according to the following formula:

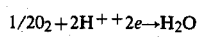

in this case, the theoretical electric potential at 25° C. is 1.23 volt.

An electrolyte-retaining matrix 3 is interposed between the hydrogen electrode 1 and the air electrode 2. A separator 4 is placed outside the hydrogen electrode 1 and a separator 5 is placed outside the air electrode 2. The unit cell is thus formed. The hydrogen electrode 1 comprises an electroconductive porous base 1a made of a carbon paper or the like and a catalyst layer 1b placed thereon. The air electrode 2 comprises an electroconductive porous base 2a made of a carbon paper or the like and a catalyst layer 2b placed thereon. The separators act for separating the gas, passing the gas and collecting the current. As the catalyst, a noble metal such as platinum, ruthenium or palladium may be used. The matrix 3 is placed between the two electrodes by, for example, applying the matrix material to the catalyst layer. Hydrogen passes from an arrow 6a to an arrow 6b. Oxygen passes from an arrow 7a to an arrow 7b.

Figure 2:
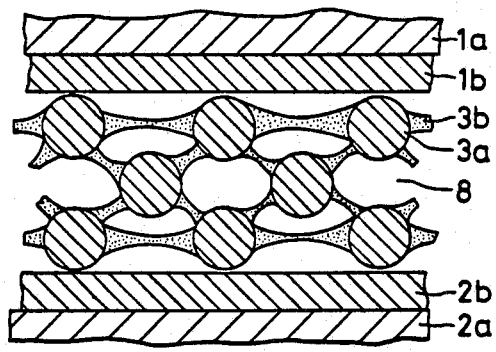
FIG. 2 shows a model of an electrolyte-retaining matrix of the present invention.

FIG. 2 shows a model of the electrolyte-retaining matrix in the fuel cell of the present invention. Particles 3a of phosphoric acid-resistant insulating substance are bound by a phosphate 3b formed by the reaction of the phosphate-forming substance and phosphoric acid, whereby an intended matrix is formed. Phosphoric acid 8 (electrolyte) is retained in the pores in the matrix.

EXAMPLES

EXAMPLE (1)

An aqueous solution of zirconium, tin, titanium, silicon or aluminum chloride or hydroxide was added to silicon carbide powder having an average particle size of 0.3 μm and the mixture was stirred. Phosphoric acid was added to the mixture. The mixing ratio of silicon carbide to the solution of zirconium, tin, titanium, silicon or aluminum salt was controlled so that the amount of silicon carbide would be 70 wt. % and that of a phosphate formed by the reaction of the metal salt with phosphoric acid would be 30 wt. %. The amount of phosphoric acid was that required for forming the phosphate plus 60 wt. % thereof based on silicon carbide. The mixture was heated to 200° C. for 15 hours to complete the reaction and also to remove water, whereby a product having a high viscosity was obtained. The product was applied to a gas diffusion electrode to form an electrolyte-retaining matrix. The matrix contains 60 wt. %, based on said silicon carbide, of free phosphoric acid which acts as the electrolyte of the fuel cell. Table 1 shows viscosities of the electrolyte-retaining matrixes obtained by the process of the present invention and that of a phosphoric acid electrolyte-retaining matrix obtained by a conventional process wherein 5 wt. % of polytetrafluoroethylene was mixed with silicon carbide and then 60 wt. % of phosphoric acid was added to the mixture. The viscosity was determined by applying a load of 50 kg to 5 g of the phosphoric acid electrolyte-retaining matrix on a flat plate and measuring an area of the matrix thus spread. It is apparent from Table 1 that a binding capacity equivalent to that obtained by using polytetrafluoroethylene can be obtained by using the inorganic binder.

A phosphoric acid-retaining capacity three times as high as that of the ordinary matrix could be obtained by using the phosphoric acid electrolyte-retaining matrix shown in the example.

TABLE 1

| No. | Binder | Spread area |
|---|---|---|
| 1 | Zirconium phosphate | 50 (cm$^2$) |
| 2 | Tin phosphate | 45 |
| 3 | Titanium phosphate | 70 |
| 4 | Silicon phosphate | 65 |
| 5 | Aluminum phosphate | 55 |
| 6 | Polytetrafluoroethylene | 50 |

EXAMPLE (2)

25 g of silicon carbide used in Example (1) was mixed with a solution of 12.2 g of zirconium oxychloride (ZrOCl$_2$.8H$_2$O) in 50 ml of water. Then, 11 g of phosphoric acid was added to the mixture and the whole was heated at 200° C. for 15 hours to obtain an electrolyte-retaining matrix. The matrix was applied to a known gas diffusion electrode in a thickness of 0.3 mm and another gas diffusion electrode was put thereon to fabricate a fuel cell. The gas diffusion electrode had been obtained by applying carbon powder carrying a very small amount of platinum to a carbon paper.

Figure 3:
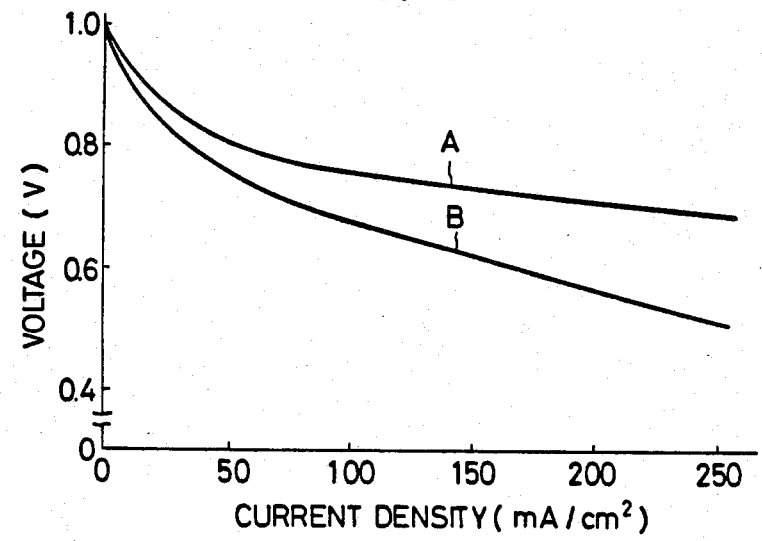
FIG. 3 is a graph showing relationships between voltage and current density in a fuel cell shown in an example of the present invention and a fuel cell used in the prior art.
Figure 4:
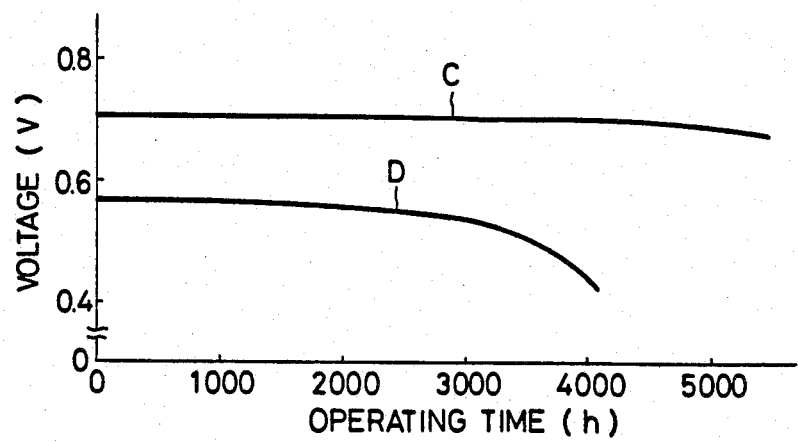
FIG. 4 is a graph showing relationships between voltage and operation time of a fuel cell shown in another example of the present invention and a fuel cell used in the prior art.

FIGS. 3 and 4 show a relationship between current density and voltage and a change of the cell voltage with time obserbed during the continuous use of the fuel cell containing the phosphoric acid electrolyte-retaining matrix obtained in this example at a current density of 200 mA/cm$^2$, respectively, as compared with properties of a fuel cell wherein polytetrafluoroethylene was used as the binder for silicon carbide. In FIGS. 3 and 4, the abscissae show the current density (mA/cm$^2$) and operating time (h), respectively, and the ordinates show voltage (V). Curves A and C represent the results obtained in this example and curbes B and D represent those of the conventional case.

It is apparent from FIGS. 3 and 4 that when the phosphoric acid electrolyte-retaining matrix of the example was used, the reduction of voltage due to the increase of current density or the reduction of voltage with the operating time were very slight and the capacities greater than those of the conventional product could be obtained. This improvement in capacity is attained because of the high affinity of the phosphoric acid compound used as the binder with phosphoric acid and the high retaining capacity of phosphoric acid. FIGS. 3 and 4 further show the results obtained at an operating temperature of 190° C. It is understood that when the phosphoric acid electrolyte-retaining matrix of the example was used, stable results could be obtained even at a high temperature.

EXAMPLE (3)

Figure 5:
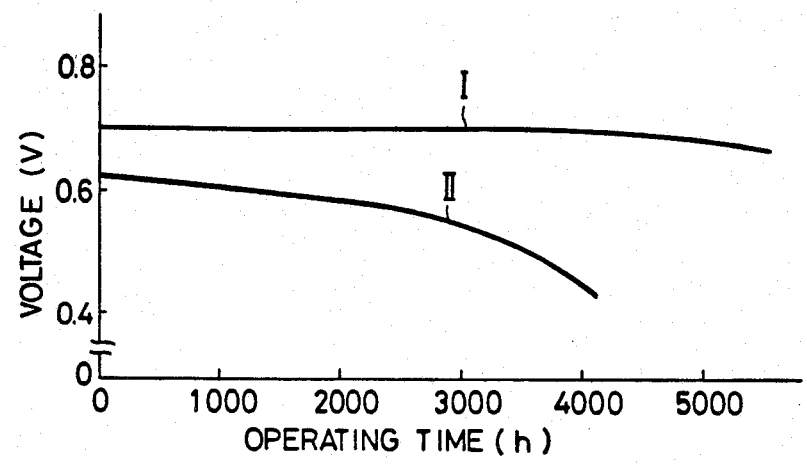
FIG. 5 is a graph showing relationships between voltage and working time of a fuel cell shown in still another example of the present invention and a fuel cell used in the prior art.

3 g of zirconium oxide was added to 7 g of silicon carbide having an average particle diameter of 0.3 μm and they were mixed thoroughly by means of a mortar. Then, 9.5 g of 85% phosphoric acid was mixed therewith. The resulting mixture was heated at 150° C. for 2 hours and then at 200° C. for 10 hours to obtain a viscous electrolyte-retaining matrix. About 55% of phosphoric acid mixed was used for the formation of the phosphate and the balance (about 45%) was used as free phosphoric acid electrolyte in the fuel cell. Ths matrix thus obtained was applied to a gas diffusion electrode to fabricate a fuel cell having substantially the same structure as that shown in FIG. 3. The electrolyte-retaining matrix had a thickness of about 0.3 mm. FIG. 5 shows a change of the cell voltage with time observed during the continuous use of the fuel cell containing the electrolyte-retaining matrix obtained in this example at an operating temperature of 190° C. and a current density of 200 mA/cm$^2$ as compared with the properties of an ordinary fuel cell having an electrolyte-retaining matrix comprising a mixture of silicon carbide with polytetrafluoroethylene binder. In FIG. 5, the abscissae and ordinates show operating time (h) and voltage (V), respectively and curve I shows the results of this example and curve II shows the results obtained by using the ordinary cell. It is apparent from FIG. 5 that the deterioration of capacity was not recognized even after the use of the fuel cell of this example for a long time, while the voltage was reduced seriously with time when the ordinary fuel cell was used.

EXAMPLE (4)

Figure 6:
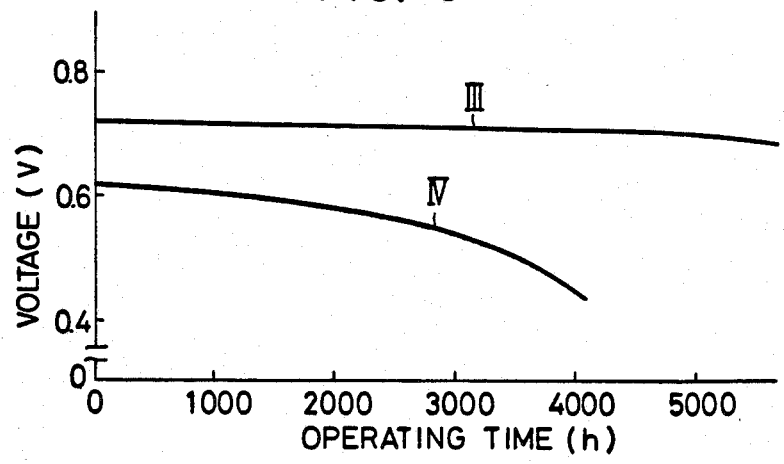
FIG. 6 is a graph showing a relationships between voltage and operation time of a fuel cell shown in a further example of the present invention and a fuel cell used in the prior art.

A solution of 22 g of zirconium oxychloride (ZrOCL$_2$.8H$_2$O) in 10 ml of water was added to 7 g of silicon carbide to obtain a mixture. Then, 7.5 g of 85% phosphoric acid was added to the mixture. After the thorough stirring, the mixture was heated at 150° C. for 2 hours and then at 200° C. for 10 hours to obtain a highly viscous electrolyte-retaining matrix. About 50% of phosphoric acid mixed was used for the formation of the phosphate and the balance (about 50%) was used as free phosphoric acid electrolyte in the fuel cell. The thus obtained matrix was applied to a gas diffusion electrode to fabricate a fuel cell having substantially the same structure as in Example (1). FIG. 6 shows a change of the cell voltage with time observed during the operation carried out under the same conditions as in Example (1) as compared with the properties of an ordinary fuel cell having an electrolyte-retaining matrix comprising a mixture of silicon carbide with polytetrafluoroethylene binder. In FIG. 6, the abscissae and ordinates show operation time (h) and voltage (V), respectively and curve III shows the results of this example and curve IV shows the results obtained by using the ordinary cell. It is apparent from FIG. 6 that the effects obtained in Example (4) were similar to those obtained in Example (3).

More particularly, the fuel cell containing the electrolyte-retaining matrix of this example was stable even at a high temperature. In addition, the affinity of the matrix with phosphoric acid was improved, since silicon carbide was bound by the phosphate and, therefore, the power of retaining phosphoric acid was improved remarkably and the capacity was not deteriorated even after the operation for a long time.

What is claimed is:

1. A process for producing a phosphoric acid-type fuel cell comprising a step of interposing a phosphoric acid electrolyte-retaining matrix between a pair of gas-diffusion electrodes, the electrolyte-retaining matrix being prepared by a method comprising the following steps:
   (1) preparing a mixture consisting essentially of silicon carbide powder and a metal phosphate-forming inorganic material, said silicon carbide powder having an average particle size of 0.1 to 10 μm;
   (2) adding phosphoric acid in an amount larger than that required for forming a phosphate by the reaction with the inorganic material to the mixture; and
   (3) heating the phosphoric acid-containing mixture to a temperature of 100°–250° C. to form the metal phosphate as a binder bonding the silicon carbide together and to form a matrix retaining phosphoric acid as electrolyte therein; said matrix consisting essentially of 30-90 weight % of silicon carbide powder and 10-70 weight % of the metal phosphate.

2. A process according to claim 1 wherein the phosphoric acid is added to the mixture in such an amount that 40-80 wt. %, based on the silicon carbide powder, of phosphoric acid is present in free form other than phosphate.

3. A process for producing a phosphoric acid-type fuel cell according to claim 1 wherein the inorganic material is a metal oxide.

4. A process for producing a phosphate-type fuel cell according to claim 1 wherein the inorganic material is a metal salt.

5. A process for producing a phosphoric acid-type fuel cell according to claim 3 wherein the metal oxide is zirconium oxide.

6. A process for producing a phosphoric acid-type fuel cell according to claim 4 characterized in that the metal salt is zirconium chloride.

7. A process for producing a fuel cell according to claim 1, wherein a mixture of said silicon carbide with a metal salt solution is prepared.

8. A process for producing a fuel cell according to claim 3 wherein the metal oxide is tin oxide.

9. A process for producing a fuel cell according to claim 3 wherein the metal oxide is titanium oxide.

10. A process for producing a fuel cell according to claim 3 wherein the metal oxide is silicon oxide.

11. A process for producing a fuel cell according to claim 3 wherein the metal oxide is aluminum oxide.

12. A process for producing a fuel cell according to claim 4, wherein the metal salt is selected from the group consisting of a halide, a hydroxide, an oxychloride and a nitrate of at least one element selected from the group consisting of Zr, Ti, Sn, Si and Al.

13. A process for producing a fuel cell according to claim 1, wherein the inorganic material is a metal selected from the group consisting of Zr, Ti, Sn, Si and a mixture thereof.

14. A process for producing a fuel cell comprising a step of interposing an electrolyte-retaining matrix between a pair of gas-diffusion electrodes, wherein the electrolyte-retaining matrix is prepared by a method comprising the following steps:
  (1) preparing a mixture consisting essentially of silicon carbide powder and a metal phosphate-forming inorganic material, said silicon carbide powder having an average particle size of 0.1 to 10 $\mu$m;
  (2) adding phosphoric acid in an amount required for forming a phosphate by the reaction with the inorganic material to the mixture; and
  (3) heating the phosphoric acid containing mixture to a temperature of 100°-250° C. to form the metal phosphate as a binder bonding the silicon carbide powder together and to form a matrix retaining phosphoric acid as electrolyte therein; said matrix consisting essentially of 30-90 weight % of silicon carbide powder and 10-70 weight % of the metal phosphate.

15. A process for producing a fuel cell according to claim 14 wherein the electrolyte to be retained by the matrix is phosphoric acid.

16. A process for producing a fuel cell according to claim 14 wherein the inorganic substance is zirconium oxide.

17. A process for producing a fuel cell according to claim 14 wherein a mixture of said silicon carbide with a metal salt solution is prepared.

* * * * *